(12) United States Patent
Anschuetz (10) Patent No.: US 10,118,682 B2
(45) Date of Patent: Nov. 6, 2018

(54) METHOD AND SYSTEM FOR CONTROLLING TRIM POSITION OF A PROPULSION DEVICE ON A MARINE VESSEL

(71) Applicant: Brunswick Corporation, Lake Forest, IL (US)

(72) Inventor: Steven M. Anschuetz, Fond du Lac, WI (US)

(73) Assignee: Brunswick Corporation, Mettawa, IL (US)

( * ) Notice: Subject to any disclaimer, the term of this patent is extended or adjusted under 35 U.S.C. 154(b) by 150 days.

(21) Appl. No.: 15/243,203

(22) Filed: Aug. 22, 2016

(65) Prior Publication Data

US 2018/0050780 A1     Feb. 22, 2018

(51) Int. Cl.
*B63H 20/00* (2006.01)
*B63H 20/10* (2006.01)
*B63H 21/21* (2006.01)

(52) U.S. Cl.
CPC ....... *B63H 20/10* (2013.01); *B63H 2020/003* (2013.01); *B63H 2021/216* (2013.01)

(58) Field of Classification Search
USPC ........ 701/1, 21, 22; 440/1, 61 T, 61 H, 61 J, 440/84–87
See application file for complete search history.

(56) References Cited

U.S. PATENT DOCUMENTS

| | | |
|---|---|---|
| 3,777,694 A | 12/1973 | Best |
| 3,999,502 A | 12/1976 | Mayer |
| 4,050,359 A | 9/1977 | Mayer |
| 4,318,699 A | 3/1982 | Wenstadt et al. |
| 4,490,120 A | 12/1984 | Hundertmark |
| 4,565,528 A | 1/1986 | Nakase |
| 4,718,872 A | 1/1988 | Olson et al. |
| 4,749,926 A | 6/1988 | Ontolchik |
| 4,762,079 A * | 8/1988 | Takeuchi ............. B63H 21/265 114/152 |
| 4,776,818 A | 10/1988 | Cahoon et al. |
| 4,824,407 A | 4/1989 | Torigai et al. |

(Continued)

FOREIGN PATENT DOCUMENTS

| | | |
|---|---|---|
| EP | 2368791 B1 | 1/2013 |
| JP | 61-108098 | 5/1986 |

(Continued)

OTHER PUBLICATIONS

Japanese Office Action for Japanese Application 2017-136367 dated Nov. 28, 2017.

(Continued)

*Primary Examiner* — Jonathan L Sample
(74) *Attorney, Agent, or Firm* — Andrus Intellectual Property Law LLP (57) ABSTRACT

A method of controlling trim position of a propulsion device includes receiving a current engine speed and a current trim position of the propulsion device, and then detecting at least a threshold increase in engine speed of the propulsion device or at least a threshold drop in engine load on the propulsion device. A reduced trim position is then determined based on the current trim position, and a trim actuator is operated to move the propulsion device to the reduced trim position.

20 Claims, 6 Drawing Sheets

(56) References Cited

U.S. PATENT DOCUMENTS

| | | | |
|---|---|---|---|
| 4,836,810 A | 6/1989 | Entringer | |
| 4,861,292 A | 8/1989 | Griffiths et al. | |
| 4,872,857 A | 10/1989 | Newman et al. | |
| 4,898,563 A | 2/1990 | Torigai et al. | |
| 4,908,766 A | 3/1990 | Takeuchi | |
| 4,931,025 A | 6/1990 | Torigai et al. | |
| 4,939,660 A | 7/1990 | Newman et al. | |
| 4,940,434 A | 7/1990 | Kiesling | |
| 4,957,457 A | 9/1990 | Probst et al. | |
| 5,080,064 A | 1/1992 | Buslepp et al. | |
| 5,113,780 A | 5/1992 | Bennett et al. | |
| 5,142,473 A | 8/1992 | Davis | |
| 5,171,172 A | 12/1992 | Heaton et al. | |
| 5,263,432 A | 11/1993 | Davis | |
| 5,352,137 A | 10/1994 | Iwai et al. | |
| 5,366,393 A | 11/1994 | Uenage et al. | |
| 5,385,110 A | 1/1995 | Bennett et al. | |
| 5,474,012 A | 12/1995 | Yamada et al. | |
| 5,474,013 A | 12/1995 | Wittmaier | |
| 5,507,672 A | 4/1996 | Imaeda | |
| 5,540,174 A | 7/1996 | Kishi et al. | |
| 5,647,780 A | 7/1997 | Hosoi | |
| 5,683,275 A | 11/1997 | Nanami | |
| 5,707,263 A | 1/1998 | Eick et al. | |
| 5,832,860 A | 11/1998 | Lexau | |
| 5,836,851 A | 11/1998 | Ruman | |
| 5,848,582 A | 12/1998 | Ehlers et al. | |
| 5,879,209 A | 3/1999 | Jones | |
| 6,007,391 A | 12/1999 | Eilert | |
| 6,009,371 A | 12/1999 | Kobayashi | |
| 6,095,077 A | 8/2000 | DeAgro | |
| 6,152,102 A | 11/2000 | Ruman | |
| 6,167,830 B1 | 1/2001 | Pilger | |
| 6,273,771 B1 * | 8/2001 | Buckley | B63H 21/213 114/144 RE |
| 6,280,269 B1 * | 8/2001 | Gaynor | B63B 49/00 440/84 |
| 6,298,824 B1 | 10/2001 | Suhre | |
| 6,322,404 B1 | 11/2001 | Magee et al. | |
| 6,354,237 B1 | 3/2002 | Gaynor et al. | |
| 6,425,370 B1 | 7/2002 | Kramer | |
| 6,458,003 B1 | 10/2002 | Krueger | |
| 6,561,016 B1 | 5/2003 | Suhre et al. | |
| 6,583,728 B1 | 6/2003 | Staerzl | |
| 6,587,765 B1 | 7/2003 | Graham et al. | |
| 6,701,890 B1 | 3/2004 | Suhre et al. | |
| 6,733,350 B2 | 5/2004 | Lida et al. | |
| 6,745,715 B1 | 6/2004 | Shen et al. | |
| 6,757,606 B1 | 6/2004 | Gonring | |
| 6,997,763 B2 | 2/2006 | Kaji | |
| 7,143,363 B1 | 11/2006 | Gaynor et al. | |
| 7,156,709 B1 | 1/2007 | Staerzl et al. | |
| 7,163,000 B2 | 1/2007 | Ishida et al. | |
| 7,188,581 B1 | 3/2007 | Davis et al. | |
| 7,311,058 B1 | 12/2007 | Brooks et al. | |
| 7,347,753 B1 | 3/2008 | Caldwell et al. | |
| 7,357,120 B2 | 4/2008 | Kaji | |
| 7,389,165 B2 | 6/2008 | Kaji | |
| 7,416,456 B1 | 8/2008 | Gonring et al. | |
| 7,462,082 B2 | 12/2008 | Kishibata et al. | |
| 7,473,149 B2 | 1/2009 | Mizokawa | |
| 7,524,219 B2 | 4/2009 | Torrangs et al. | |
| 7,543,544 B2 | 6/2009 | Yap | |
| 7,556,547 B2 | 7/2009 | Kaji | |
| 7,617,026 B2 | 11/2009 | Gee et al. | |
| 7,641,525 B2 | 1/2010 | Morvillo | |
| 7,917,283 B2 | 3/2011 | Kado | |
| 7,942,711 B1 | 5/2011 | Swan | |
| 7,972,243 B2 | 7/2011 | Kado et al. | |
| 7,976,354 B2 | 7/2011 | Kubota et al. | |
| 8,011,982 B1 | 9/2011 | Baier et al. | |
| 8,113,892 B1 | 2/2012 | Gable et al. | |
| 8,145,370 B2 | 3/2012 | Borrett | |
| 8,216,007 B2 | 7/2012 | Moore | |
| 8,261,682 B1 | 9/2012 | DeVito | |
| 8,340,847 B2 | 12/2012 | Sako et al. | |
| 8,376,791 B2 | 2/2013 | Chiecchi | |
| 8,376,793 B2 | 2/2013 | Chiecchi | |
| 8,388,390 B2 | 3/2013 | Kuriyagawa et al. | |
| 8,428,799 B2 | 4/2013 | Cansiani et al. | |
| 8,444,446 B2 | 5/2013 | Kuriyagawa et al. | |
| 8,457,820 B1 | 6/2013 | Gonring | |
| 8,480,445 B2 | 7/2013 | Morvillo | |
| 8,583,300 B2 | 11/2013 | Oehlgrien et al. | |
| 8,622,777 B1 | 1/2014 | McNalley et al. | |
| 8,631,753 B2 | 1/2014 | Morvillo | |
| 8,740,658 B2 | 6/2014 | Kuriyagawa | |
| 8,762,022 B1 | 6/2014 | Arbuckle et al. | |
| 8,807,059 B1 | 8/2014 | Samples et al. | |
| 8,855,890 B2 | 10/2014 | Egle et al. | |
| 8,858,278 B2 | 10/2014 | Morvillo | |
| 9,039,468 B1 | 5/2015 | Arbuckle et al. | |
| 9,052,717 B1 | 6/2015 | Walser et al. | |
| 9,145,839 B1 | 9/2015 | Andrasko | |
| 9,156,536 B1 | 10/2015 | Arbuckle et al. | |
| 9,248,898 B1 | 2/2016 | Kirchhoff et al. | |
| 9,278,740 B1 | 3/2016 | Andrasko et al. | |
| 9,290,252 B1 * | 3/2016 | Tuchscherer | B63H 20/08 |
| 9,381,989 B1 | 7/2016 | Poirier | |
| 9,567,052 B2 | 2/2017 | Torrangs et al. | |
| 9,643,698 B1 * | 5/2017 | Andrasko | B63B 45/04 |
| 9,695,764 B1 * | 7/2017 | Christiansen | F02D 41/0025 |
| 9,751,605 B1 * | 9/2017 | Anschuetz | B63H 20/10 |
| 9,764,810 B1 * | 9/2017 | Andrasko | B63H 20/10 |
| 9,944,375 B1 * | 4/2018 | Martin | B63H 20/10 |
| 2002/0086593 A1 | 7/2002 | Shidara et al. | |
| 2003/0000500 A1 | 1/2003 | Chatfield | |
| 2003/0013359 A1 | 1/2003 | Suganuma et al. | |
| 2003/0027468 A1 | 2/2003 | Into | |
| 2003/0054704 A1 | 3/2003 | Kanno | |
| 2003/0082963 A1 * | 5/2003 | Motose | B63H 21/22 440/2 |
| 2003/0120360 A1 | 6/2003 | Yasui et al. | |
| 2004/0069271 A1 | 4/2004 | Kanno et al. | |
| 2004/0069272 A1 | 4/2004 | Allen et al. | |
| 2004/0193338 A1 * | 9/2004 | Kaji | B63H 20/08 701/21 |
| 2005/0245147 A1 | 1/2005 | Takada et al. | |
| 2006/0047406 A1 | 3/2006 | Chatfield et al. | |
| 2006/0166573 A1 | 7/2006 | Vetta et al. | |
| 2007/0089654 A1 | 4/2007 | Bradley et al. | |
| 2007/0089660 A1 | 4/2007 | Bradley et al. | |
| 2008/0051979 A1 | 2/2008 | Yasui et al. | |
| 2008/0133075 A1 * | 6/2008 | St-Pierre | B63H 11/08 701/21 |
| 2008/0280511 A1 | 11/2008 | Kado | |
| 2009/0117788 A1 * | 5/2009 | Kaji | B63H 21/265 440/1 |
| 2009/0171520 A1 * | 7/2009 | Kaji | B63H 20/12 701/21 |
| 2010/0191397 A1 | 7/2010 | Nose et al. | |
| 2011/0202258 A1 | 8/2011 | Fukushima et al. | |
| 2011/0217886 A1 * | 9/2011 | Kuriyagawa | B63H 21/21 440/1 |
| 2011/0217888 A1 * | 9/2011 | Kuriyagawa | B63H 20/14 440/86 |
| 2011/0263167 A1 | 10/2011 | Chiechhi et al. | |
| 2011/0297462 A1 | 12/2011 | Grajkowski et al. | |
| 2012/0135649 A1 | 5/2012 | Morvillo | |
| 2012/0191275 A1 | 7/2012 | Clever et al. | |
| 2013/0312651 A1 | 11/2013 | Gai | |
| 2013/0340667 A1 | 12/2013 | Morvillo | |
| 2014/0209007 A1 | 7/2014 | Morvillo | |
| 2014/0224166 A1 | 8/2014 | Morvillo | |
| 2014/0295717 A1 | 10/2014 | Kuriyagawa et al. | |

(56) References Cited

U.S. PATENT DOCUMENTS

2016/0068247 A1* 3/2016 Morvillo ............ B63H 20/08
 701/21

FOREIGN PATENT DOCUMENTS

| JP | 2002-308582 | 10/2002 |
|----|-------------|---------|
| JP | 2003-120395 | 4/2003 |
| JP | 2007-191138 | 8/2007 |
| JP | 2011-0183902 | 9/2011 |

OTHER PUBLICATIONS

Japanese Office Action for Japanese Application 2017-136252 dated Nov. 14, 2017.

Japanese Office Action for Japanese Application 2017-136422 dated Nov. 14, 2017.

Andrasko et al., "Systems and Methods for Providing Notification Regarding Trim Angle of a Marine Propulsion Device", Unpublished U.S. Appl. No. 14/573,200, filed Dec. 17, 2014.

Andrasko et al., "System and Method for Controlling Attitude of a Marine Vessel Having Trim Tabs", Unpublished U.S. Appl. No. 14/472,565, filed Aug. 29, 2014.

Andrasko et al., "Systems and Methods for Controlling Movement of Drive Units on a Marine Vessel", Unpublished U.S. Appl. No. 14/177,762, filed Feb. 11, 2014.

Mercury Marine, 90-8M0081623 JPO Owners Manual—Auto Trim Portion, Section 2—On the Water, May 2013, p. 21.

Mercury Marine, 90-8M0076286 JPO Service Manual—Auto Trim Portion, Theory of Operation, Jul. 2013, p. 2A-5.

Andrasko et al., "Systems and Methods for Automatically Controlling Attitude of a Marine Vessel with Trim Devices", Unpublished U.S. Appl. No. 14/873,803, filed Oct. 2, 2015.

Anscheutz, "System and Method for Trimming a Trimmable Marine Device with Respect to a Marine Vessel", Unpublished U.S. Appl. No. 15/003,326, filed Jan. 21, 2016.

Anscheutz, "System and Method for Trimming a Trimmable Marine Device with Respect to a Marine Vessel", Unpublished U.S. Appl. No. 15/003,335, filed Jan. 21, 2016.

O'Brien et al., "Systems and Methods for Setting Engine Speed Relative to Operator Demand", Unpublished U.S. Appl. No. 14/684,952, filed Apr. 13, 2015.

Mercury Marine, SmartCraft Manual, p. 21, 2013.

Mercury Marine, SmartCraft Manual, p. 2A-5, 2013.

U.S. Appl. No. 13/770,591, filed Feb. 19, 2013.

U.S. Appl. No. 14/177,767, filed Feb. 11, 2014.

Newport, Motion Control Coordinate System, www.newport.com, pp. 7-2 through 7-25, website visited Nov. 18, 2014.

U.S. Appl. No. 14/284,795, filed May 22, 2014.

Dengel et al., "Trim Control Systems and Methods for Marine Vessels", Unpublished U.S. Appl. No. 13/770,591, filed Feb. 19, 2013.

* cited by examiner

METHOD AND SYSTEM FOR CONTROLLING TRIM POSITION OF A PROPULSION DEVICE ON A MARINE VESSEL

FIELD

The present disclosure relates to systems and methods for controlling trim position of trimmable propulsion devices with respect to a transom of a marine vessel.

BACKGROUND

U.S. Pat. No. 6,298,824, incorporated by reference herein, discloses a control system for a fuel injected engine provides an engine control unit that receives signals from a throttle handle that is manually manipulated by an operator of a marine vessel. The engine control unit also measures engine speed and various other parameters, such as manifold absolute pressure, temperature, barometric pressure, and throttle position. The engine control unit controls the timing of fuel injectors and the injection system and also controls the position of a throttle plate. No direct connection is provided between a manually manipulated throttle handle and the throttle plate. All operating parameters are either calculated as a function of ambient conditions or determined by selecting parameters from matrices which allow the engine control unit to set the operating parameters as a function of engine speed and torque demand, as represented by the position of the throttle handle.

U.S. Pat. No. 6,322,404, incorporated by reference herein, discloses a Hall effect rotational position sensor is mounted on a pivotable member of a marine propulsion system and a rotatable portion of the rotational position sensor is attached to a drive structure of the marine propulsion system. Relative movement between the pivotable member, such as a gimbal ring, and the drive structure, such as the outboard drive portion of the marine propulsion system, cause relative movement between the rotatable and stationary portions of the rotational position sensor. As a result, signals can be provided which are representative of the angular position between the drive structure and the pivotable member.

U.S. Pat. No. 7,156,709, incorporated by reference herein, discloses the calibration procedure allows an upward maximum limit of tilt to be automatically determined and stored as an operator rotates a marine propulsion device relative to a marine vessel with a particular indication present. That indication can be a grounded circuit point which informs a microprocessor that at calibration procedure is occurring in relation to an upward trim limit. When the ground wire is removed or disconnected from the circuit point, the microprocessor knows that the calibration process is complete. During the rotation of the outboard motor or marine propulsion device in an upward direction, both the angular position of the outboard motor and the direction of change of a signal from a trim sensor are stored.

U.S. Pat. No. 7,416,456, incorporated by reference herein, discloses an automatic trim control system changes the trim angle of a marine propulsion device as a function of the speed of the marine vessel relative to the water in which it is operated. The changing of the trim angle occurs between first and second speed magnitudes which operate as minimum and maximum speed thresholds.

U.S. Pat. No. 8,762,022, incorporated by reference herein, discloses a system and method is provided for efficiently changing controlled engine speed of a marine internal combustion engine in a marine propulsion system for propelling a marine vessel. The system responds to the operator changing the operator-selected engine speed, from a first-selected engine speed to a second-selected engine speed, by predicting throttle position needed to provide the second-selected engine speed, and providing a feed forward signal moving the throttle to the predicted throttle position, without waiting for a slower responding PID controller and/or overshoot thereof, and concomitant instability or oscillation, and then uses the engine speed control system including any PID controller to maintain engine speed at the second-selected engine speed.

U.S. Pat. No. 8,011,982, incorporated by reference herein, discloses a support system for an outboard motor provides a restricted member that is attached to a bottom portion of the outboard motor and a restricting member that is attached to a support structure that is, in turn, attached to a transom of a marine vessel. The restricted member is prevented from moving in a starboard or port direction by a magnitude greater than a preselected magnitude that is defined by a gap between restricting and restricted surfaces that move into contact with each other when forces on the outboard motor cause a lower portion of the outboard motor to move by a magnitude greater than a predefined limit in either the port or starboard directions. Preselected gaps between restricting and restricted surfaces are sized to allow nominal vibration at low operating speeds of the outboard motor while restricting excessive lateral movement during operation at high speed.

U.S. Pat. No. 8,457,820, incorporated by reference herein, discloses a method is provided by controlling the operation of a marine vessel subject to porpoising. The method includes sensing an operational characteristic of the marine vessel which is indicative of porpoising of the marine vessel, and responding to the sensing of the operational characteristic with a response that is representative of the operational characteristic of the marine vessel as being indicative of the porpoising of the marine vessel.

Unpublished U.S. patent application Ser. No. 14/684,952, filed Apr. 13, 2015, and assigned to the Applicant of the present application, incorporated by reference herein, discloses a method for setting an engine speed of an internal combustion engine in a marine propulsion device to an engine speed setpoint includes receiving an operator demand from an input device and learning an adapted maximum engine speed. An engine speed setpoint is calculated by scaling the adapted maximum engine speed relative to the operator demand. The method includes predicting a position of a throttle valve of the engine that is needed to achieve the engine speed setpoint, and determining a feed forward signal that will move the throttle valve to the predicted position. A marine propulsion system has an electronic control unit that learns the adapted maximum engine speed, calculates the engine speed setpoint by scaling the adapted maximum engine speed relative to the operator demand, predicts the position of the throttle valve, and determines the feed forward signal that will move the throttle valve to the predicted position.

Unpublished U.S. patent application Ser. No. 14/873,803, filed Oct. 2, 2015, and assigned to the Applicant of the present application, incorporated by reference herein, discloses systems and methods disclosed herein control position of a trimmable drive unit with respect to a marine vessel. A controller determines a target trim position as a function of vessel or engine speed. An actual trim position is measured and compared to the target trim position. The controller sends a control signal to a trim actuator to trim the drive unit toward the target trim position if the actual trim position is not equal to the target trim position and if at least one of the following is true: a defined dwell time has elapsed since a previous control signal was sent to the trim actuator to trim the drive unit; a given number of previous control signals has not been exceeded in an attempt to achieve the target trim position; and a difference between the target trim position and the actual trim position is outside of a given deadband.

Unpublished U.S. patent application Ser. No. 15/003,326, filed Jan. 21, 2016, and assigned to the Applicant of the present application, incorporated by reference herein, discloses a method for controlling a trim system on a marine vessel includes receiving an actual trim position of a trimmable marine device at a controller and determining a trim position error by comparing the actual trim position to a target trim position with the controller. The method also includes determining an acceleration rate of the marine vessel. In response to determining that the trim position error exceeds a first error threshold and the magnitude of the acceleration rate exceeds a given rate threshold, the controller commands the marine device to the target trim position. In response to determining that the trim position error exceeds the first error threshold and the acceleration rate does not exceed the given rate threshold, the controller commands the marine device to a setpoint trim position that is different from the target trim position. An associated system is also disclosed.

Unpublished U.S. patent application Ser. No. 15/003,335, filed Jan. 21, 2016, and assigned to the Applicant of the present application, which is incorporated by reference herein, discloses a method for controlling a trim system on a marine vessel includes receiving an actual trim position of a trimmable marine device at a controller and determining a magnitude of a trim position error by comparing the actual trim position to a target trim position with the controller. The method also includes determining a magnitude of an acceleration rate of the marine vessel. The controller determines the activation time of a trim actuator coupled to and rotating the marine device with respect to the marine vessel based on the magnitude of the trim position error and the magnitude of the acceleration rate. The controller then sends a control signal to activate the trim actuator to rotate the marine device toward the target trim position. The method includes discontinuing the control signal once the activation time expires to deactivate the trim actuator. A corresponding system is also disclosed.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In one embodiment, a method of controlling trim position of a propulsion device includes receiving a current engine speed and a current trim position of the propulsion device, and then detecting at least a threshold increase in engine speed or at least a threshold drop in engine load on the propulsion device. A reduced trim position is then determined based on the current trim position, and a trim actuator is operated to move the propulsion device to the reduced trim position.

One embodiment of a system for controlling trim position of a propulsion device on a marine vessel includes a trim actuator configured to adjust a trim position of the propulsion device and a controller that controls the trim actuator. The controller is configured to receive a current engine speed and a current trim position of the trim actuator, and to detect a threshold increase in engine speed or a threshold drop in engine load on the propulsion device. The controller is further configured to determine a reduced trim position based on the current trim position, and to operate the trim actuator to move the propulsion device to the reduced trim position.

BRIEF DESCRIPTION OF THE DRAWINGS

The present disclosure is described with reference to the following Figures. The same numbers are used throughout the Figures to reference like features and like components.

DETAILED DESCRIPTION

In the present description, certain terms have been used for brevity, clarity and understanding. No unnecessary limitations are to be inferred therefrom beyond the requirement of the prior art because such terms are used for descriptive purposes only and are intended to be broadly construed.

The present disclosure relates to systems and methods for controlling a trim actuator on a marine vessel so as to control a relative position of a propulsion device mounted to the transom of a marine vessel. Those skilled in the art of marine vessel propulsion and control are familiar with many different ways in which the trim angle of a propulsion device, such as an outboard motor or stern drive, can be varied to change the handling or fuel efficiency of the vessel. For example, many manual trim control systems are known to those skilled in the art. In typical operation, the operator of a marine vessel can change the trim angle of an associated outboard motor as the velocity of the vessel changes. This is done to maintain an appropriate angle of the vessel with respect to the water as it achieves a planing speed and as it increases its velocity over the water while on plane. The operator inputs a command to change the trim angle for example by using a keypad, button, or similar input device with "trim up" and "trim down" input choices (e.g., see FIG. 4).

The systems of the present disclosure may be capable of carrying out automatic trim (auto-trim) methods, in which the propulsion device is automatically trimmed up or down with respect to its current position, depending on a desired attitude of the marine vessel with respect to vessel speed. Auto-trim systems perform trim operations automatically, as a function of vessel speed, without requiring intervention by the operator of the marine vessel. The automatic change in trim angle of the trimmable propulsion device 10 enhances the operation of the marine vessel as it achieves planing speed and as it further increases its velocity over the water while on plane. For example, trimming the propulsion device 10 can affect a direction of thrust of a propeller with respect to a vessel transom, as well as affect vessel roll and pitch.

Figure 1:
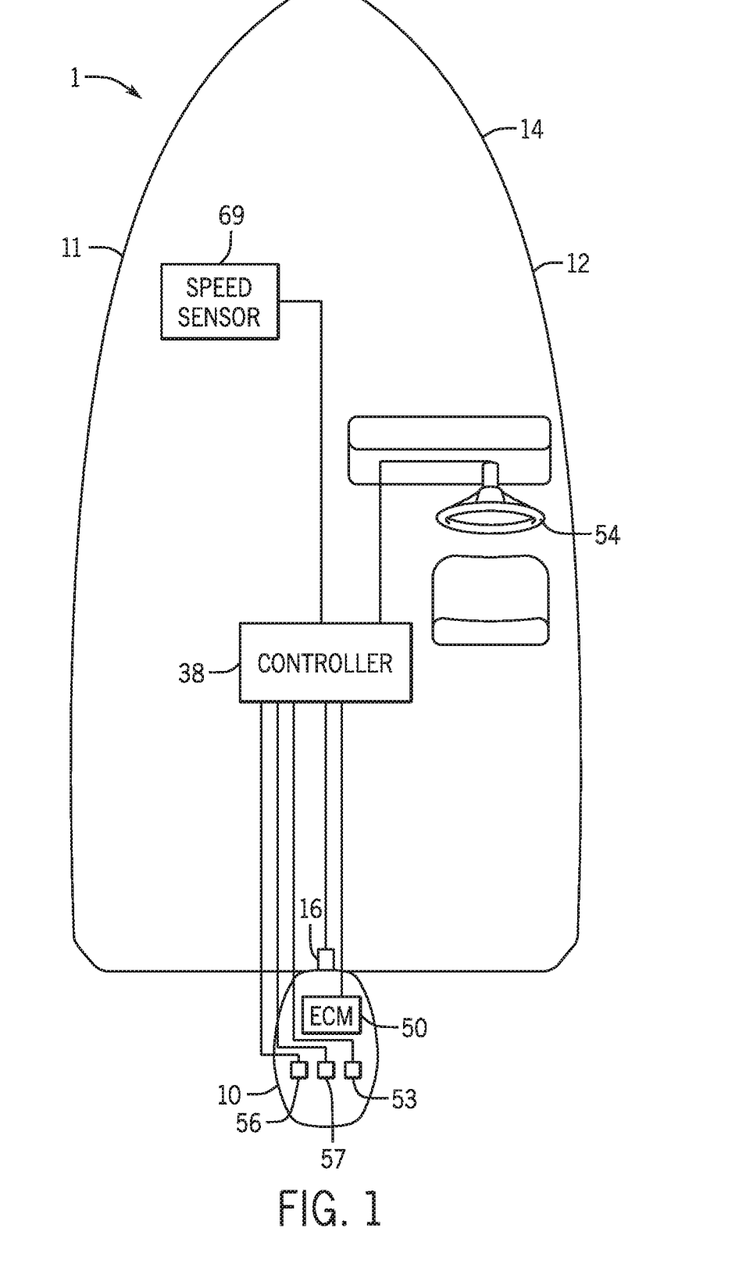
FIG. 1 is a schematic illustration of a marine vessel having a system for controlling trim position of propulsion devices.

FIG. 1 depicts one embodiment of a system 1 for controlling trim position of a propulsion device 10 on the marine vessel 14. While the methods and systems are described herein with respect to a single propulsion device 10, a person of ordinary skill in the art will understand in light of this disclosure that the disclosed methods and systems are equally applicable to marine vessels having more propulsion devices. Likewise, though the propulsion device 10 is exemplified in the FIGURES as an outboard motor, a person having ordinary skill in the art will understand in light of this disclosure that the propulsion device may also be a stern drive with a trimmable lower unit.

The trim position of the propulsion device 10 is actuated by a trim actuator 16. In one example, the trim actuator is a hydraulic piston-cylinder assembly in fluid communication with a hydraulic pump-motor combination, although the principles of some of the below examples could apply equally to electric linear actuators, pneumatic actuators, or other types of trim devices. The trim actuator may be actuated between an extended position and a retracted position by provision of hydraulic fluid, electrical power, pneumatic fluid, etc. The extension and retraction of the trim actuator can be used to rotate a trimmable propulsion device up and down with respect to a marine vessel to which it is coupled.

During cornering at high speeds, the marine vessel 14 rolls toward the port side 11 or starboard side 12 (depending on the direction of the turn). When in a very trimmed out position, the propulsion device(s) 10 on the turning marine vessel 14 tends to come out of the water, known as prop venting or blow out. Through experimentation and research in the relevant field, the present inventor has recognized that the problems and issues relating to prop venting, such as may occur in a steep turn, can be lessened and alleviated by changing the trim position of the propulsion device 10, such as by a control method that detects the occurrence of blowout and promptly reduces the trim position of the propulsion device as the vessel turns. The inventor has further recognized that current auto-trim systems and methods are insufficient because their response to prop venting and blow out is delayed, requiring a measured loss of speed before trimming down the propulsion device 10. The detection of speed loss can be delayed further due to filtering of the GPS signal and waiting on the minimum time between corrections, resulting in allowance of extended periods of prop venting or blow out, causing significant loss of speed, uneven propulsion, and even damage to the propulsion device 10. To address this problem, the inventor developed the disclosed method and system to immediately detect the occurrence of prop venting or blowout based on a change in engine speed or engine load, and then to automatically move the propulsion device to a reduced trim position.

With reference to FIGS. 1-4, the trimming operation of the trim actuator 16 is controlled by controller 38, which is communicatively connected to the trim actuator 16 to control activation thereof. The controller 38 controls trim of the propulsion device 10 by controlling the trim actuator 16, and such control may be provided as described herein based on one or more of engine speed, vessel speed, current trim position, and/or parameters that indicate engine load, such as throttle position, intake manifold absolute pressure, or intake mass flow rate. In the depicted embodiment, the controller 38 receives engine speed, or engine revolutions per minute (RPM), from the engine control module (ECM) 59 on the propulsion device 10. For example, the propulsion device 10 may be provided with an engine speed sensor 58, such as but not limited to a tachometer, that determines a speed of the engine 60 powering the propulsion device 10 in rotations per minute (RPM). For example, the engine speed can be used to approximate a vessel speed (i.e., to calculate a pseudo vessel speed). In certain embodiments, the controller 38 may also receive input from one or more sensors providing values that may indicate engine load, such as throttle position sensor 53, mass airflow sensor 56 and/or manifold absolute pressure sensor 57. The position of the throttle valve 52 is varied to allow more or less air into the intake manifold of the engine 60, such as in response to an increase or decrease in user demand from throttle lever 68. Throttle position sensor 53 senses and provides information regarding the position of the throttle valve 52 metering air intake into the internal combustion engine 60. The mass airflow (MAF) sensor 56 provides information to the controller 38 regarding the mass flow rate of air entering the engine 60. For example, the MAF sensor 56 may be a "hotwire" sensor located in the air duct leading to the throttle body and positioned to sense the air volume and density entering the intake manifold 55. The manifold absolute pressure (MAP) sensor 57 may be any type of pressure sensor capable of providing information to the controller 38 that is representative of manifold absolute pressure.

When a prop venting or blowout event occurs, the load on the propulsion device 10 suddenly decreases, as the propeller experiences reduced or no resistance from the water. Depending on the configuration of the propulsion device, the sudden decrease in load may cause either a sudden spike in engine speed or a sudden change in throttle valve 52 position. In a system where operator demand to the engine 60 (such as from a throttle lever 68) is associated with throttle position, the engine speed will spike as a result of the sudden decrease in engine load when the propeller vents or blows out. Since the operator demand is tied to position of the throttle valve 52, the throttle valve 52 position remains constant at a given throttle lever 68 position and the engine speed varies in response to changing conditions. Thus, in such a configuration, monitoring of engine speed can provide good detection of prop venting or blowout events.

However, in other embodiments where operator demand (such as from a throttle lever 68) is correlated to a particular engine speed, the engine speed will remain constant at the demanded value, even under sudden decreases in engine load, and instead the position of the throttle valve is varied to maintain that demanded engine speed. Examples of such systems are described in U.S. Pat. Nos. 6,298,824, 8,762, 022, and U.S. application Ser. No. 14/684,952, which are incorporated herein above. In such systems, the decrease in engine load requires less throttle to maintain a constant speed, resulting in lower manifold pressure (MAP) and intake mass flow rate (MAF). Accordingly, information regarding a sudden decrease in engine load can be gleaned from the MAF sensor 56, as a decrease in airflow through the intake manifold will occur as an immediate response to the throttle closing in response to the sudden decrease in load. Likewise, the sudden decrease in engine load will be reflected as a decrease in manifold pressure sensed by the MAP sensor 57, because the air pressure in the intake manifold 55 will decrease as the throttle valve 52 is closed in response to the sudden decrease in load.

As described above, the present inventor has recognized that the trim position of the propulsion device 10 on a marine vessel can be automatically controlled at high speeds to stop a prop venting or blowout event. Namely, upon detection of prop venting or blowout, such as by detecting a sudden increase in engine speed or a sudden decrease in engine load, the system 1 for controlling trim position determines a reduced trim position and operates the trim actuator to move the propulsion device to the reduced trim position. In other words, the propulsion device 10 is be trimmed in (or trimmed down, or trim decreased) from the current trim position in order to move the propeller further down underneath the surface of the water.

Figure 2:
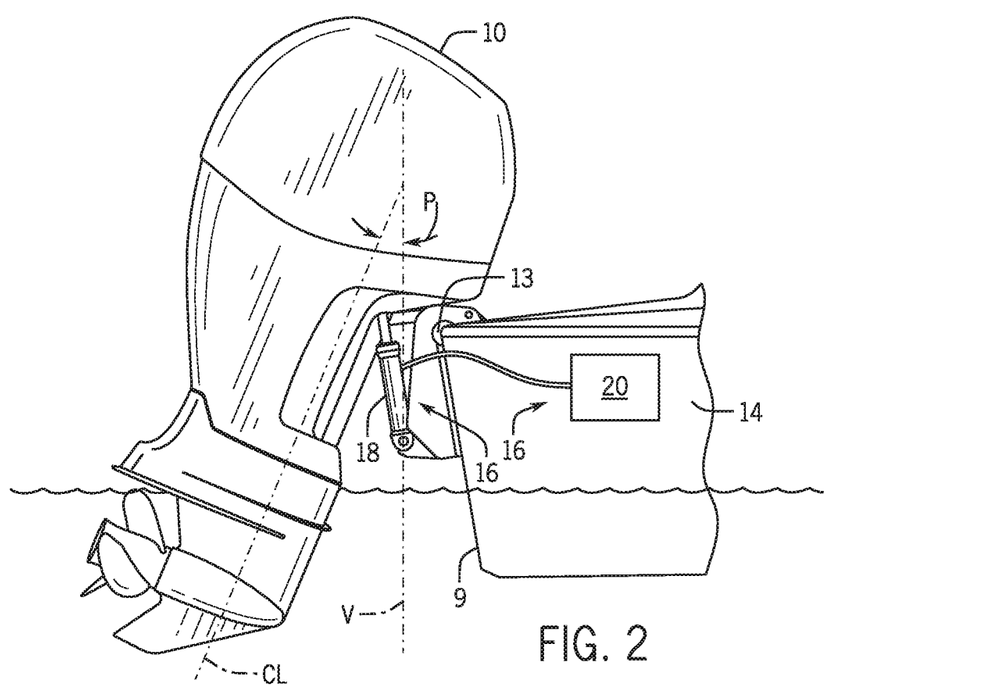
FIG. 2 depicts one embodiment of a trimmable propulsion device according to the present disclosure.

Referring to FIG. 2, the position of a trimmable propulsion device 10 (such as the outboard motor shown herein) with respect to the transom 9 of a marine vessel 14 is controlled by a hydraulic trim actuator 16. The trim actuator 16 includes a hydraulic piston-cylinder assembly 18 connected to a hydraulic pump-motor combination 20. The piston-cylinder assembly 18 has a first end (here, the cylinder end) coupled to the transom 9 of the vessel 14 and a second, opposite end (here, the rod end) coupled to the propulsion device 10, as known to those having ordinary skill in the art. The piston-cylinder assembly 18 operates to rotate the propulsion device 10 about a horizontal trim axis 13 to a trimmed-out position, to a trimmed-in position, or to maintain the propulsion device 10 in any position there between as the pump-motor combination 20 provides hydraulic fluid to the piston-cylinder assembly 18 to move the piston within the cylinder. As mentioned, however, other types of hydro-mechanical or electro-mechanical actuators could be used in other examples.

Figure 3:
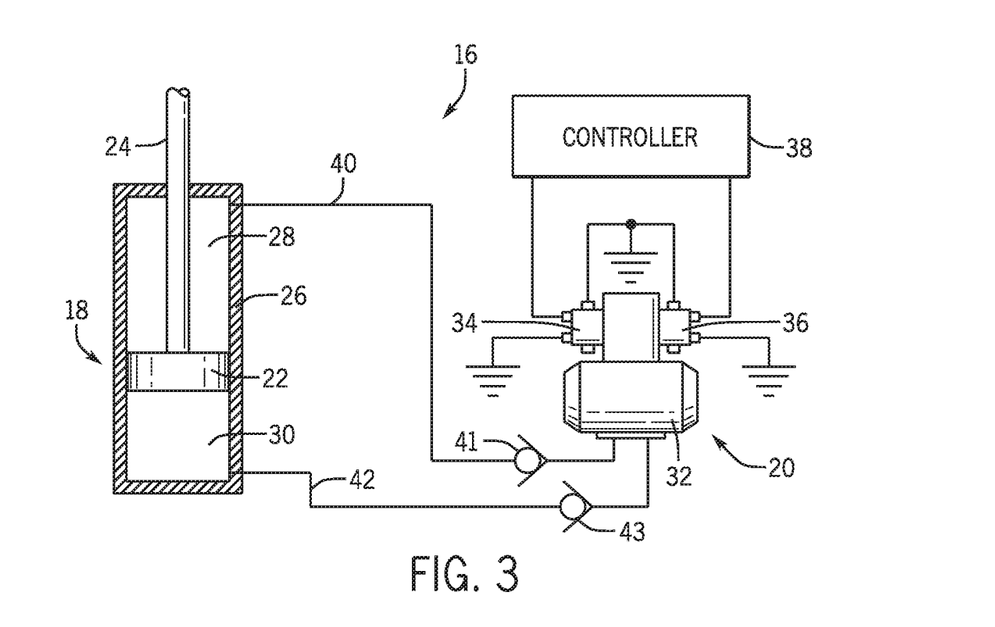
FIG. 3 is a schematic depiction of one embodiment of a trim actuator in a system for controlling trim position of propulsion devices.

One example of a hydraulic trim actuator 16 is shown in FIG. 3. The piston-cylinder assembly 18 is shown schematically as having a piston 22 connected to a rod 24 disposed in a cylinder 26. The piston 22 defines a first chamber 28 within the cylinder 26 and a second chamber 30 within the cylinder 26, both of which chambers 28, 30 change in size as the piston 22 moves within the cylinder 26. The pump-motor combination 20 includes a pump-motor 32 connected to a trim-in relay 34 and a trim-out relay 36. In other examples, the trim-in relay 34 and the trim-out relay 36 are a single relay that can turn the pump-motor 32 on or off and can effectuate a trim-in or trim-out movement of the trim actuator 16. The relays 34 and 36 are connected to a controller 38 that controls energizing of solenoids in the relays 34 and 36, which act as switches to couple a power source such as a battery (not shown) to chamber 28 of the piston-cylinder assembly 18, and a second hydraulic line 42 couples the pump-motor 32 to the second chamber 30 of the piston-cylinder assembly 18. As long as the trim-in relay 34 is activated, the pump-motor 32 provides hydraulic fluid through the first hydraulic line 40 to the first chamber 28 of the piston-cylinder assembly 18, thereby pushing the piston 22 downwardly within the cylinder 26 and lowering (trimming in, or trimming down) the propulsion device 10 coupled to the rod 24. As long as the trim-out relay 36 is activated, the pump-motor 32 provides hydraulic fluid through the second hydraulic line 42 to the second chamber 30 of the piston-cylinder assembly 18, thereby pushing the piston 22 upwardly within the cylinder 26 and raising (trimming out, or trimming up) the propulsion device 10 coupled to the rod 24. Hydraulic fluid can be removed from the opposite chamber 28 or 30 of the cylinder 26 into which fluid is not being pumped in either instance, and drained to a tank or circulated through the pump-motor 32.

In this way, the trim actuator 16 can position the propulsion device 10 at different angles with respect to the transom 9. These may be a neutral (level) trim position, in which the propulsion device 10 is in more or less of a vertical position; a trimmed in (trimmed down) position; or a trimmed out (trimmed up) position. A trimmed out position, as shown in FIG. 2, is often used when the marine vessel 14 is on plane and high speeds are required. At high speeds, the trimmed out position causes the bow of the marine vessel 14 to rise out of the water, resulting in better handling and increased fuel efficiency. Thus, many auto-trim algorithms include determining a target trim position at which to orient the propulsion device 10 with the controller 38 based on speed, such as but not limited to engine speed, vessel speed, a combination of vessel speed and engine speed, or a tradeoff between vessel speed and engine speed depending on additional vessel conditions. Examples of such systems are shown and described in U.S. Pat. No. 7,416,456; and U.S. application Ser. Nos. 14/873,803; 15/003,326; 15/003,335, which are incorporated herein by reference.

The controller 38 may define the trim position by reference to a vertical line V. When the centerline CL of the propulsion device 10 is parallel to the vertical line V, the controller 38 may consider this to be zero trim. Trim position can be quantified as a value P with respect to the vertical line V, which represents the angle or comparative position between the centerline CL of the propulsion device 10 and the vertical line V. This value P can be expressed as an angle, a percentage of a total angle to which the propulsion device 10 can be trimmed, a scalar value, a polar coordinate, or any other appropriate unit. For purposes of the description provided herein below, the angle P will be expressed as a percentage of total allowable trim angle, which can be measured from vertical, from a fully trimmed out position, or from a fully trimmed in position.

Figure 4:
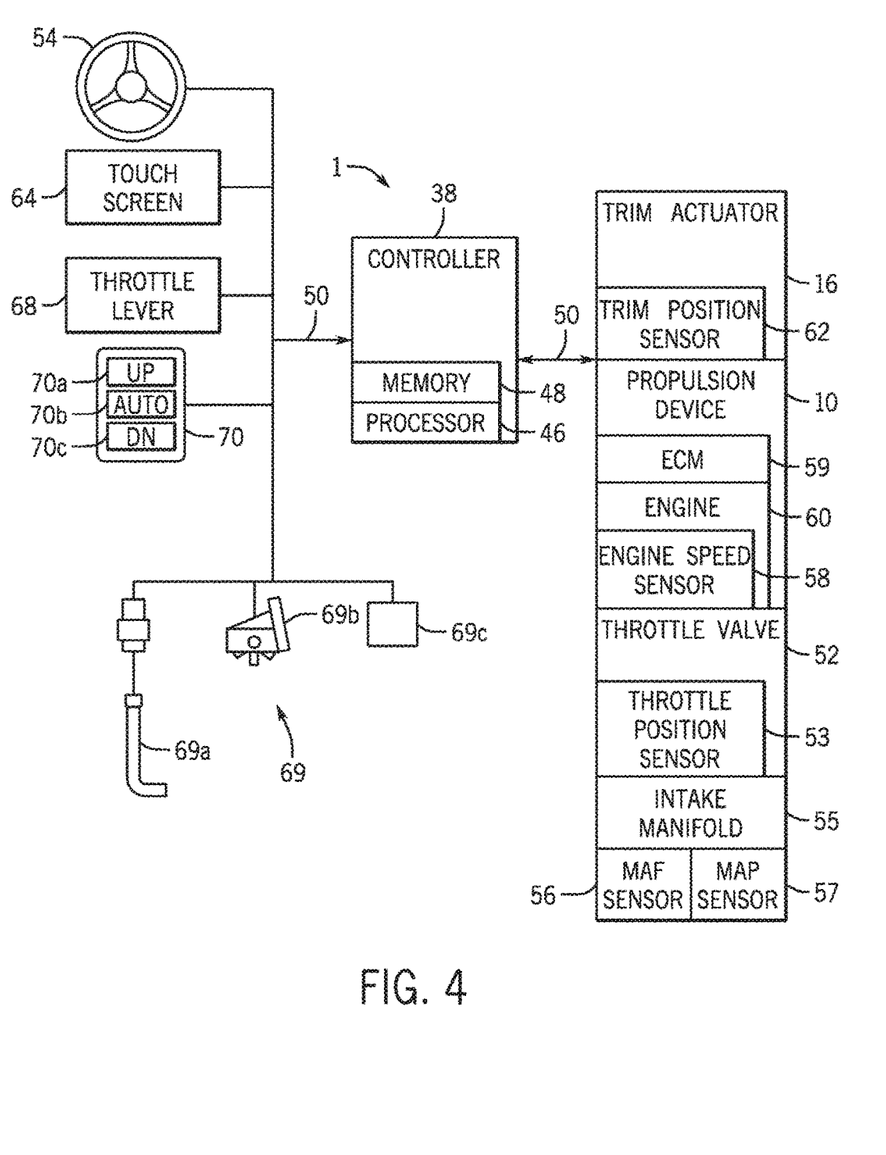
FIG. 4 is a schematic diagram depicting another embodiment of a system for controlling trim position of a propulsion device.

FIG. 4 shows a schematic of an embodiment of the system 1 for controlling trim position. In the example shown, the system 1 includes controller 38, which is programmable and includes a processor 46 and a memory 48. The controller 38 can be located anywhere on the marine vessel 14 and/or located remote from the marine vessel 14 and can communicate with various components of the system 1 via wired and/or wireless communication links, as will be explained further herein below. Although FIGS. 1 and 3 show a single controller 38, the system 1 may include more than one controller 38. For example, the system 1 may have a controller 38 located at or near a helm of the marine vessel 14 and can also have one or more controllers located at or near the propulsion device 10. The controller 38 may be a dedicated device, or may be incorporated in and a function of a multi-function control device, such as incorporated into a helm control module (HCM) or other control device and software communicatively connected to the ECM 59. Portions of the method disclosed herein below can be carried out by a single controller or by several separate controllers.

In some examples, the controller 38 may be a computing system that includes a processing system, storage system, software, and input/output (I/O) interfaces for communicating with devices such as those shown in FIG. 4, and described herein. The processing system loads and executes software from the storage system, such as software programmed with a trim control method. When executed by the computing system, trim control software directs the processing system to operate as described herein to execute the trim control method. The computing system may include one or many application modules and one or more processors, which may be communicatively connected. The processing system can comprise a microprocessor (e.g., processor 46) and other circuitry that retrieves and executes software from the storage system. Processing system can be implemented within a single processing device but can also be distributed across multiple processing devices or sub-systems that cooperate in executing program instructions. Non-limiting examples of the processing system include general purpose central processing units, application specific processors, and logic devices.

The storage system (e.g., memory 48) can comprise any storage media readable by the processing system and capable of storing software. The storage system can include volatile and non-volatile, removable and non-removable media implemented in any method or technology for storage of information, such as computer readable instructions, data structures, program modules, or other data. The storage system can be implemented as a single storage device or across multiple storage devices or sub-systems. The storage system can further include additional elements, such as a control circuitry capable of communicating with the processing system. Non-limiting examples of storage media include random access memory, read only memory, magnetic discs, optical discs, flash memory, virtual memory, and non-virtual memory, magnetic sets, magnetic tape, magnetic disc storage or other magnetic storage devices, or any other medium which can be used to store the desired information and that may be accessed by a processing system. The storage media can be a non-transitory or a transitory storage media.

In this example, the controller 38 communicates with one or more components of the system 1 via a communication link 50, which can be a wired or wireless link. The controller 38 is capable of monitoring and controlling one or more operational characteristics of the system 1 and its various subsystems by sending and receiving control signals via the communication link 50. In one example, the communication link 50 is a controller area network (CAN) bus, but other types of links could be used. It should be noted that the extent of connections of the communication link 50 shown herein is for schematic purposes only, and the communication link 50 in fact provides communication between the controller 38 and each of the sensors, devices, etc. described herein, although not every connection is shown in the drawing for purposes of clarity.

As mentioned, the controller 38 receives inputs from several different sensors and/or input devices aboard or coupled to the marine vessel 14. For example, the controller 38 receives a steering input from steering input device(s), such as a joystick and/or a steering wheel 54. Alternatively or additionally, steering input may be provided by an automatic steering control system, associated with the marine vessel 14, such as a heading or waypoint control system. The controller 38 may also be provided with an input from a vessel speed sensor 69. The vessel speed sensor 69 may be, for example, a pressure-type sensor, such as pitot tube 69*a*, a paddle wheel type sensor 69*b*, or any other speed sensor appropriate for sensing the actual speed of the marine vessel. Alternatively or additionally, the vessel speed may instead be determined based on readings from a GPS device 69*c*, which calculates speed by determining how far the vessel 14 has traveled in a given amount of time. A trim position sensor 62 may also be provided for sensing an actual position of the trim actuator 16, for example, by measuring a relative position between two parts associated with the trim actuator 16. The trim position sensor 62 may be any type of sensor known to those having ordinary skill in the art, for example a Hall effect sensor or a potentiometer, such as examples provided and described in U.S. Pat. No. 6,322,404 incorporated herein by reference.

Other inputs to the system 1 can come from operator input devices such as a throttle lever 68, a keypad 70, and a touchscreen 64. In addition to speed control input, the throttle lever 68 allows the operator of the marine vessel to choose to operate the vessel in neutral, forward, or reverse, as is known. The keypad 70 can be used to initiate or exit any number of control or operation modes (such as auto-trim mode), or to make selections while operating within one of the selected modes. In one example, the keypad 70 comprises an interface having a "trim up" button 70*a*, a "trim down" button 70*b*, and an "auto-trim on/resume" button 70*c*, which can be utilized by a user to control the trim position of the propulsion device 10. For example, the trim buttons 70*a* and 70*b* may provide user input to control the propulsion device to the same trim position. The touchscreen 64 can also be used to initiate or exit any number of control or operation modes (such as trim up, trim down, or auto-trim mode), and in that case the inputs can be buttons in the traditional sense or selectable screen icons. The touchscreen 64 can also display information about the system 1 to the operator of the vessel 14, such as engine speed, vessel speed, trim angle, trim operating mode, vessel acceleration rate, etc. Additionally, the touchscreen 64 may replace the keypad 70, providing the trim buttons 70*a*-70*b*.

Figure 5:
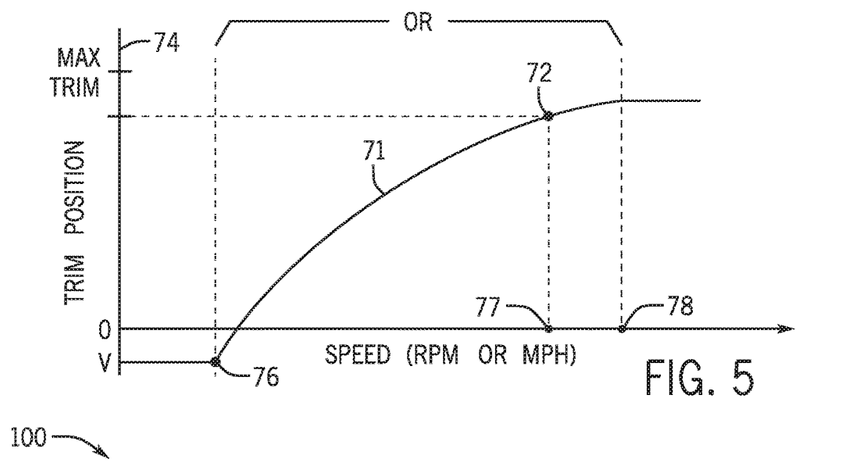
FIG. 5 exemplifies a relationship between speed and trim position for automatic trim control.

FIG. 5 depicts a graphical representation showing the relationship between trim position and speed, which may be engine RPM or vessel speed, when the marine vessel 14 is traveling in the straight ahead direction. The graph of FIG. 5 provides an example of how trim may be automatically controlled by an auto-trim system with respect to speed; however, a person having ordinary skill in the art will also understand in light of this disclosure that the method disclosed herein of controlling trim during cornering maneuver may also be applied in situations where the propulsion device 10 is controlled manually to a trim position specified by the user (such as via trim buttons 70*a* and 70*b*). Thus, the current trim position may be automatically controlled and instructed by an auto-trim system based on speed (vessel speed and/or engine RPM) or may be manually controlled by a user. The current trim position may further be a stored value, such as from the auto-trim system and/or a user control setting, or it may be a measured value, such as by the trim position sensor 62 associated with the trim actuator 16.

The trim position of the propulsion device is generally increased as the vessel speed increases and thus the propulsion device 10 is generally trimmed out (applying positive trim) at high speeds when the marine vessel is on plane. In the depicted example, the current trim position 72 is the value on the trim position curve 71 at the current speed 77. In the depicted relationship the trim position increases generally proportionally with the speed between the lower speed threshold 76 and the upper speed threshold 78. The propulsion device 10 is movable to a maximum positive trim position 74 (or maximum trim out position). In the graph, zero trim represents the vertical position when the propulsion device 10 is in line with vertical line V (FIG. 2). Negative trim positions, or trim in positions, are represented below the zero point on the trim position axis. In the depicted embodiment, the propulsion device 10 is maintained in a trimmed in position until the vessel reaches a lower speed threshold, which may be at or near the planing speed. Below the lower speed threshold 76, the trim position is maintained at a constant value. Likewise, above an upper speed threshold 78 the trim is also maintained at a constant value. This avoids making trim adjustments at speeds below the planing speed and at very high speeds. Avoiding adjustment at very high speeds may be desirable in certain embodiments because adjusting trim at very high speeds may introduce unwanted instability for certain marine vessels 14. Accordingly, trim position is only adjusted within an operating range OR between a lower speed threshold 76 and an upper speed threshold 78. In that range, the trim position is determined based on the current speed 77 and the relationship is depicted by the trim position curve 71. The relationship between speed and trim position may be linear or curvilinear, and may vary, for example, based on vessel configuration.

Figure 6:
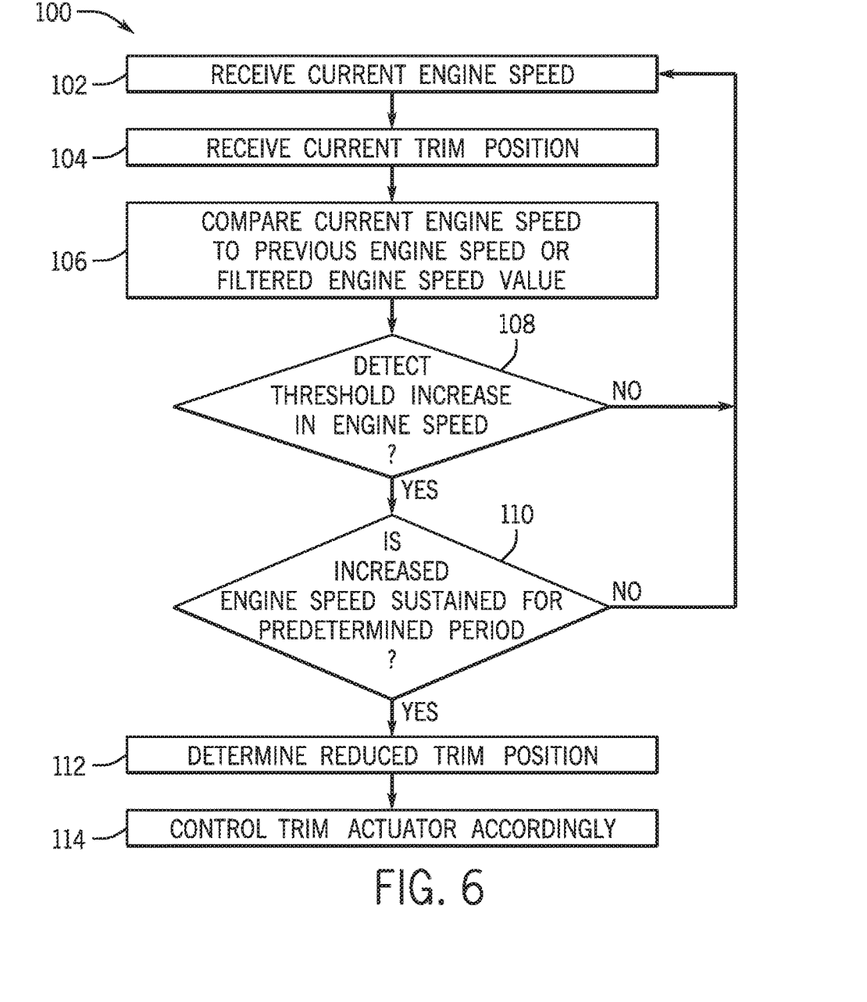
FIG. 6 provides a flowchart of one embodiment of a method for controlling trim position of a propulsion device.

FIG. 6 depicts one embodiment of a method 100 of controlling trim position of one or more propulsion devices 10 on a marine vessel 14. The current engine speed is received at step 102, such as from engine speed sensor 58 and/or ECM 59. The current trim position of the propulsion device 10 is received at step 104. For example, the current trim position may be the current value of a variable stored by an auto-trim control process, or subsystem, such as a value stored in memory 48 and retrievable by the processor 46. Alternatively, the current trim position may be a value received from a trim position sensor 62, reflecting the actual measured current trim position of the propulsion device 10. At step 106, the current engine speed is compared to a previous engine speed or filtered engine speed value to detect whether there has been a sudden increase in engine speed. For example, the current engine speed measurement may be compared to the previous engine speed measurement taken by the engine speed sensor 58, or to one or more of several previous engine speed values in order to eliminate the chances of arriving at an errant value that is not reflective of the actual current speed of the engine 60. Alternatively or additionally, the current engine speed may be compared to a filtered engine speed value, such as a time-base filtered value, which would provide a stable comparison value not susceptible to momentary measurement error.

Step 108 determines whether at least a threshold increase in engine speed has been detected that indicates that prop venting or blowout is occurring. In various embodiments, the threshold engine speed value may be a calculated value or a predetermined fixed value. For example, the threshold increase in engine speed may be a percentage increase amount or may be a fixed value. To provide just one example, a relevant threshold increase in engine speed that might be indicative of prop venting or blowout in some marine vessels could be in the range of 250 RPM to 2000 RPM, or more, depending on the previous reading in respect to the engine's rated speed. If the threshold in engine speed is not detected at step 108, then the method returns to step 102 where it receives and assesses a subsequent engine speed measurement. If the threshold increase in engine speed is detected at step 108, then instructions may be executed at step 110 to determine whether the increase in engine speed is sustained for at least a predetermined period of time. For example, subsequently received engine speed values may be compared to the previous engine speed or a filtered engine speed value used in the above-described step 108 to determine whether the threshold increase detected at step 108 has been sustained or was just a momentary increase. Checking whether the increased engine speed is sustained avoids over adjustment of trim based on momentary or erroneous current engine speed measurements. Further, verifying that the increase is sustained differentiates a true prop venting or blowout events from other events where a sudden decrease in load may occur, such as wave hopping. The value of the predetermined period for sustaining the engine speed increase may also vary based on configuration of the marine vessel 14 and/or propulsion device 10; however, in one exemplary embodiment, an appropriate predetermined period for step 110 may be in the range of 1 to 5 seconds. If the increase in engine speed is not sustained, then the system returns to step 102 to assess a subsequent engine speed value. If the speed increase is sustained for the predetermined period, then a reduced trim position is determined at step 112. The trim actuator 16 is then controlled at step 114 to move the propulsion device 10 to the reduced trim position, which should alleviate or eliminate the detected prop venting or blowout.

The reduced trim position is determined based on the current trim position, such as the value received at step 102, and speed, which may be vessel speed and/or engine speed. The reduced trim position may be a calibrated value that is likely to alleviate the prop venting and/or blowout event at a given vessel speed or engine speed and current trim position, but otherwise minimizes the amount that the trim is adjusted. For example, the calibrated value may account for how the particular marine vessel 14 and propulsion device 10 configuration behaves at a given speed, such as how it corners and how it responds to trim changes. For example, the reduced trim position may be determined by accessing a lookup table containing trim reduction values based on current trim position and vessel speed or engine speed. Alternatively, the reduced trim position may be a predetermined trim reduction amount. For example, the trim position of the propulsion device may be continually reduced by the predetermined trim amount until the propeller hooks back up with the water, e.g., until the engine load increases to an expected value. In still other embodiments, the trim reduction amount may be a calculated value, such as a percentage of the current trim position.

Figure 8A:
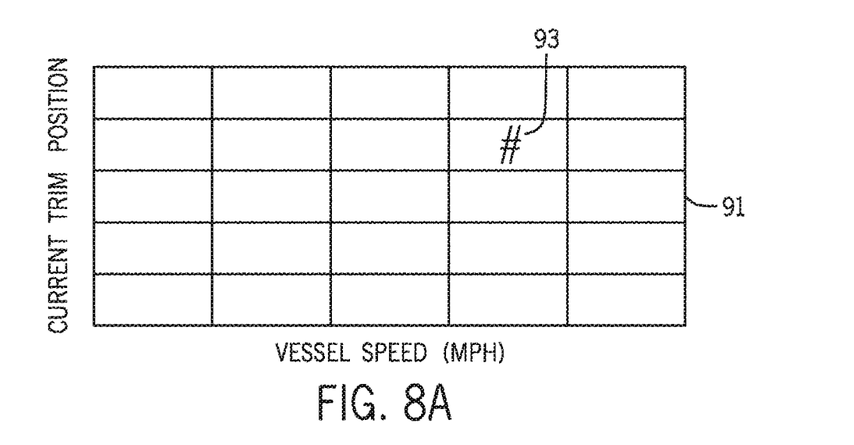
FIGS. 8A and 8B depict exemplary lookup tables for determining a reduced trim position for a propulsion device.

FIG. 8A depicts one exemplary embodiment of a lookup table 91 containing trim reduction values 93 based on current trim position and vessel speed in miles-per-hour. For example, the vessel speed may be determined based on information from the vessel speed sensor 69, several examples of which are described above. The trim reduction values 93 in the lookup table 91 may be the actual reduced trim positions, or the reduction values 93 may be any value upon which the reduced trim positions may be determined. For example, the trim reduction values 93 may be trim adjustment values for the propulsion device 10, which could then be subtracted from the current trim position.

Figure 8B:
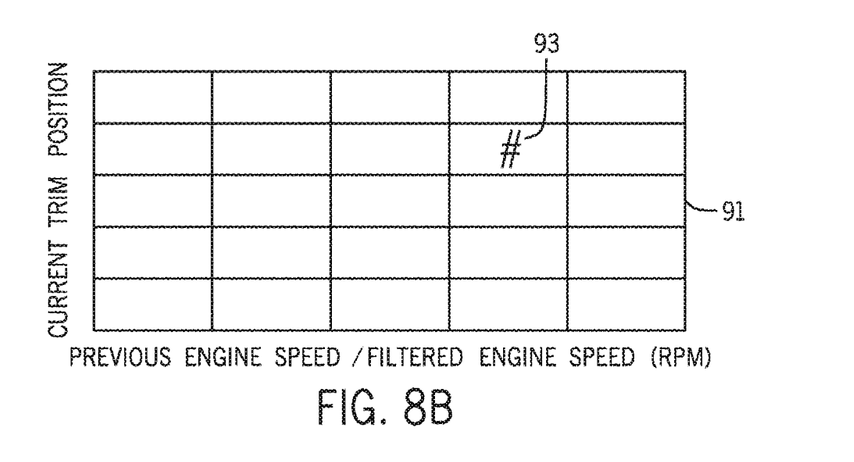

FIG. 8B depicts another exemplary embodiment of a lookup table 91 that could be used in determination of the reduced trim position, where the trim reduction value is determined based on a value reflective of the engine speed prior to the detection of the sudden increase resulting from the prop venting or blowout event. In the depicted example, the lookup table 91 contains trim reduction values 93 based on the current trim position and either previous engine speed or filtered engine speed values in RPM. For example, the previous engine speed or filtered engine speed values may be those utilized at step 108 described above where the threshold increase in engine speed was first detected.

Figure 7:
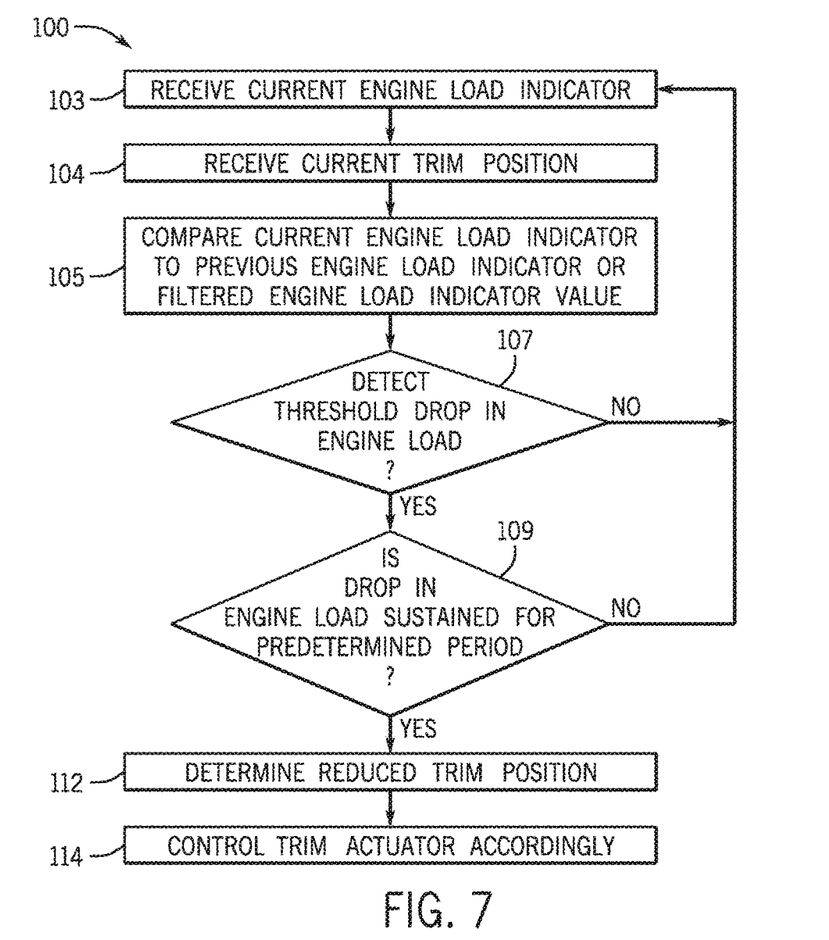
FIG. 7 is a flowchart depicting another embodiment of a method for controlling trim position of a propulsion device.

FIG. 7 depicts another embodiment of a method 100 for controlling trim position. A current engine load indicator value is received at step 103. For example, the engine load indicator value may be the throttle position sensed by the throttle position sensor 53, or the mass airflow entering the intake manifold sensed by the MAF sensor 56, or the manifold absolute pressure in the intake manifold measured by the MAP sensor 57. The current trim position is received at step 104, and the current load indicator value is compared to a previous load indicator value or a filtered load indicator value at step 105 to detect whether a sudden drop in engine load has occurred that would indicate prop venting or blowout. For example, the current load indicator value may be compared to one or more of the most recent engine load measurements, or to a filtered load value. By the comparison it is determined whether the current load indicator is less than the previous engine load indicator or filtered load indicator value by at least a threshold amount. In various embodiments, throttle position, MAP, and/or MAF may be used as the basis for the load assessment. For throttle position, it may be determined whether the current throttle position measured by the throttle position sensor 53 differs from a previous measured throttle position, such as the most recent one or more measurements or a filtered throttle position value, by more than a predetermined throttle position amount. The predetermined throttle position amount is an amount of throttle closing that would be associated with, or caused by, a significant decrease in water resistance on the propeller, which could be a calibrated or calculated value. Alternatively or additionally, the drop in engine load could be detected by determining whether the current mass flow rate measured by the MAF sensor 56 represents a decrease by more than a predetermined mass flow rate. Likewise, the drop in engine load could be detected by determining whether the current manifold pressure measured by the MAP sensor 57 represents a decrease by more than a predetermined manifold pressure amount.

If the current load indicator is less than the previous engine load indicator or filtered load indicator value by at least the threshold amount at step 107, then instructions are executed at step 109 to determine whether the drop in engine load is sustained for at least a predetermined period of time. If the relevant threshold drop in engine load is not detected, or the drop in engine load is not sustained, then the system returns to step 103 and assesses a subsequent engine load indicator. If the drop in engine load is sustained, then a reduced trim position is determined at step 112, such as by utilizing one of the exemplary lookup tables provided in FIGS. 8A and 8B. The trim actuator 16 is then controlled at step 114 to move the propulsion device 10 to the reduced trim position.

In various embodiments, the propulsion device 10 may be held at the reduced trim position for a period of time, after which the propulsion device may be returned to its original trim position before the venting or blow out occurred. Alternatively or additionally, trim control may be turned back over to the speed-based auto trim control module. The handoff between the reduced trim position and original trim position control module, either from being manually trimmed or automatically trimmed, could take place after a calibrated time has expired, or after an increase in vessel speed measured by speed sensor 69 is detected again, indicating that the propeller is no longer in a blow-out or venting condition.

This written description uses examples to disclose the invention, including the best mode, and also to enable any person skilled in the art to make and use the invention. Certain terms have been used for brevity, clarity and understanding. No unnecessary limitations are to be inferred therefrom beyond the requirement of the prior art because such terms are used for descriptive purposes only and are intended to be broadly construed. The patentable scope of the invention is defined by the claims, and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

What is claimed is:

1. A method of controlling trim position of a propulsion device on a marine vessel, the method comprising:
   receiving a current trim position of the propulsion device;
   detecting at least one of a threshold increase in engine speed of the propulsion device and a threshold drop in engine load on the propulsion device indicating reduced resistance on a propeller of the propulsion device;
   upon detecting the threshold increase in engine speed or the threshold drop in engine load, determining a reduced trim position based on the current trim position; and
   operating a trim actuator to move the propulsion device to the reduced trim position.

2. The method of claim 1, further comprising determining whether the increase in engine speed or the drop in engine load is sustained for at least a predetermined time period before operating the trim actuator to move the propulsion device to the reduced trim position.

3. The method of claim 1, further comprising receiving a vessel speed, and determining the reduced trim position based on the vessel speed and the current trim position.

4. The method of claim 1, further comprising receiving a current engine speed, and wherein detecting the threshold increase in engine speed includes determining whether the current engine speed differs from a previous engine speed by more than a predetermined engine speed amount.

5. The method of claim 4, further comprising determining the reduced trim position based on the previous engine speed and the current trim position.

6. The method of claim 1, further comprising receiving a current engine speed, and wherein detecting the threshold increase in engine speed includes determining whether the current engine speed differs from a filtered engine speed value by more than a predetermined engine speed amount.

7. The method of claim 6, further comprising determining the reduced trim position based on the filtered engine speed value and the current trim position.

8. The method of claim 1, further comprising receiving a current throttle position, wherein detecting the threshold drop in engine load includes determining whether the current throttle position differs from a previous throttle position by more than a predetermined throttle position amount.

9. The method of claim 1, further comprising receiving a current manifold pressure, wherein detecting the threshold drop in engine load includes determining whether the current manifold pressure differs from a previous manifold pressure by more than a predetermined manifold pressure amount.

10. The method of claim 1, further comprising receiving a current mass flow rate, wherein detecting the threshold drop in engine load includes determining whether the current mass flow rate differs from a previous flow rate by more than a predetermined mass flow rate amount.

11. A system for controlling trim position of a propulsion device on a marine vessel, the system comprising:
    a trim actuator configured to adjust a trim position of the propulsion device;

a controller configured to:
receive a current trim position of the trim actuator;
detect at least one of a threshold increase in engine speed of the propulsion device and a threshold drop in engine load on the propulsion device indicating reduced resistance on a propeller of the propulsion device;
upon detecting the threshold increase in engine speed or the threshold drop in engine load, determine a reduced trim position based on the current trim position; and
operate the trim actuator to move the propulsion device to the reduced trim position.

12. The system of claim 11, wherein the controller is further configured to determine whether the increase in engine speed or the drop in engine load is sustained for at least a predetermined time period before operating the trim actuator to move the propulsion device to the reduced trim position.

13. The system of claim 11, wherein the controller is further configured to receive a vessel speed and determine the reduced trim position based on the vessel speed and the current trim position.

14. The system of claim 11, wherein the controller is further configured to receive a current engine speed and detect the threshold increase in engine speed by determining whether the current engine speed differs from a previous engine speed by more than a predetermined engine speed amount.

15. The system of claim 14, wherein the controller is further configured to determine the reduced trim position based on the previous engine speed and the current trim position.

16. The system of claim 11, wherein the controller is further configured to receive a current engine speed and detect the threshold increase in engine speed by determining whether the current engine speed differs from a filtered engine speed value by more than a predetermined engine speed amount.

17. The system of claim 16, wherein the controller is further configured to determine the reduced trim position based on the filtered engine speed value and the current trim position.

18. The system of claim 11, wherein the controller is further configured to receive a current throttle position, and to detect the threshold drop in engine load by determining whether the current throttle position differs from a previous throttle position by more than a predetermined throttle position amount.

19. The system of claim 11, wherein the controller is further configured to receive a current manifold pressure, and to detect the threshold drop in engine load by determining whether the current manifold pressure differs from a previous manifold pressure by more than a predetermined manifold pressure amount.

20. The system of claim 11, wherein the controller is further configured to receive a current mass flow rate, and to detect the threshold drop in engine load by determining whether the current mass flow rate differs from a previous flow rate by more than a predetermined mass flow rate amount.

* * * * *